Figure 1:
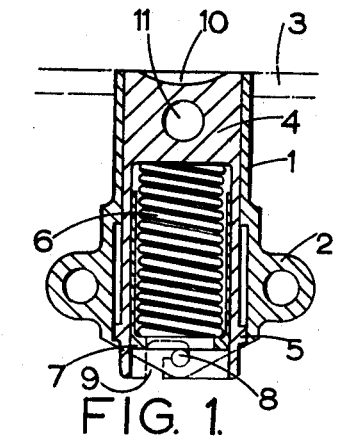

Jan. 3, 1956

H. MAYNARD 2,729,418

RETRACTABLE LASHING OR LIKE ATTACHMENT DEVICE

Filed July 3, 1953

Inventor
HARRY MAYNARD
By Richardson David and Nordon
his Attorneys

United States Patent Office 2,729,418
Patented Jan. 3, 1956

2,729,418

RETRACTABLE LASHING OR LIKE ATTACHMENT DEVICE

Harry Maynard, Hull, England, assignor to Blackburn and General Aircraft Limited, Brough, East Yorkshire, England, a British company Application July 3, 1953, Serial No. 366,025

4 Claims. (Cl. 248—361)

This invention relates to lashing or like attachment devices and is particularly concerned with such connecting devices for use in making a separable connection to the floor or wall of a compartment of an aircraft or other movable vehicle for the purpose of providing an anchorage for a lashing or the securing means for affixing a structure such as a chair and so forth.

Now the principal object of the present invention is to provide a retractable device which may be displaced to lie flush or substantially flush with the ambient surface or extended to project thereabove so that a lashing or other member to be held against displacement may readily be connected thereto.

A further object of the invention is to provide such a device in which danger of damage, due to inadvertent retraction of the attachment member by an externally applied force (such as the wheel of a vehicle passing thereover) is eliminated.

The device, according to the present invention, comprising a spring loaded attachment member which is capable of limited axial displacement in a holding member with means operable on partial rotation of the attachment member to hold it against the action of the spring in retracted position with its end flush or substantially flush with the end of the holding member.

Further, according to the present invention, the retractable attachment member on retraction and partial rotation latches with a displaceable spring loaded member.

The holding member is suitably secured with its end flush with the ambient surface, i. e., extending through a floor or wall to lie flush with the exposed surface thereof, so that when the attachment member is retracted the floor or wall has an unencumbered surface. To render the device operative the attachment member is partially rotated and so released that its spring will cause it to project to its maximum permitted extent for the connection of a lashing or other means thereto as by engaging in an aperture in the projecting portion of such member.

The attachment member is conveniently held in its retracted position by forming bayonet joint slots in the inner end thereof and by providing a transverse rod across the holding member with which such slots may engage. When the transverse rod is displaceably mounted and under spring loading, any inadvertent retraction of the attachment member with the bayonet-type slots not aligned with the rod with which they engage, the end of that member will merely bear on and displace such rod without causing any damage.

A screwdriver slot or the equivalent is provided in the exposed end of the attachment member to facilitate the turning thereof by means of a tool or a coin.

In order that the invention may be clearly understood and readily carried into effect, embodiments thereof are by way of example, hereinafter more fully described with reference to the accompanying drawings, which are given for purposes of illustration only and not of limitation.

Figure 5:
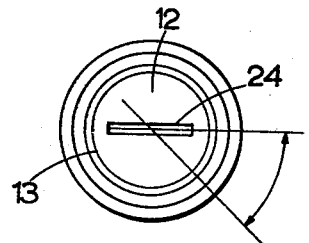
Figures 3, 4:
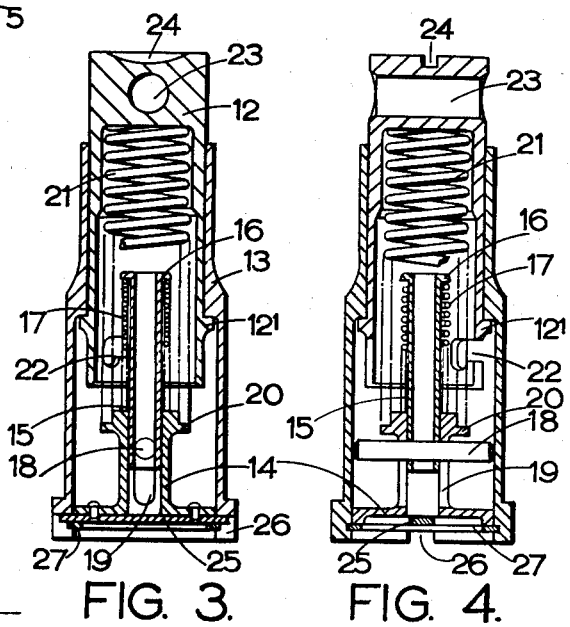
Figure 2:
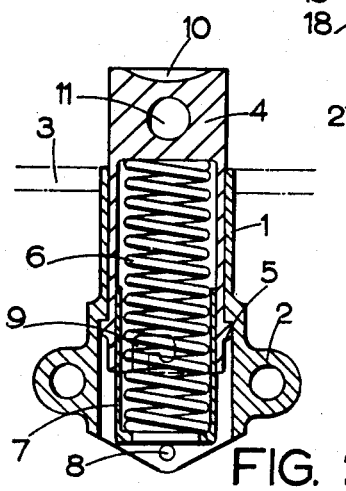
Figure 6:
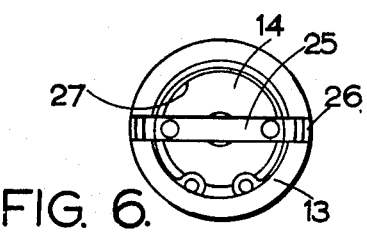

In these drawings:

Fig. 1 is a section through one form of device with the attachment member shown in retracted position, Fig. 2 is a like view with the attachment member in projecting position, Fig. 3 is a sectional elevation of another form of device, Fig. 4 is a sectional view looking on the left hand side of Fig. 3, Fig. 5 is a plan view looking down on Fig. 3, and Fig. 6 is an under plan view.

Referring now to the said drawings and in particular to Figs. 1 and 2 thereof, the device comprises a tubular holding member 1 which as shown may be formed with attachment lugs 2 by means of which it may be secured to the structure with its end extending through to lie flush with the exposed surface of a floor or wall 3 indicated by broken lines. The member 1 is formed with a bore in two diameters of which the larger is innermost.

The attachment member 4 is a part tubular circular section member which has an external annular flange 5. This member is mounted for sliding movement on the smaller diameter bore of the member 1 with its flange 5 in the larger diameter bore thereof.

A compression spring 6 is disposed in the tubular position of the member 4 to be effective on the end of such portion and on a part 7 which telescopes therein. The part 7 is held in place by a transversely extending rod 8 carried at the end of the holding member 1.

The rod 8 also forms part of the means for holding the attachment member 4 in retracted position. Thus the inner end of the tubular portion of that member 4 is provided with bayonet joint slots 9 which may engage the rod 8 and hold the member 4 retracted against the action of the spring 6, as shown in Fig. 1, after linear displacement and partial rotation of the member 4.

The exposed end of the member 4 is provided with a screw driver slot 10 or the equivalent to facilitate the turning thereof by a tool or coin. The portion of the member 4 which projects is also provided with an aperture 11 in which may engage a lashing or a bolt for securing some structure as a chair.

To render the device effective it is only necessary to partially rotate the member 4 in the opposite sense when the spring 6 will cause that member to project from the holding member 1 to an extent limited by the annular flange 5 engaging the abutment between the bores in the holding member 1 as shown in Fig. 2.

When the device described above is used in a floor, there is danger that the inadvertent retraction of the attachment member 1 due to an externally applied force, such as the wheel of a vehicle passing thereover or a mass dropping thereon, might result in the inner end of the attachment member 4 striking the rod 8 and so damaging the rod or being damaged thereby. An alternative construction in which this danger is eliminated is hereafter described with reference to Figs. 3 to 6 of the drawings.

This device is essentially similar and comprises an attachment member 12 which is likewise axially displaceable in a holding member 13, the lower end of which is closed off by a part 15. The part 15 has an external flange 16 between which and the end of the guide portion of the part 14 is a spring 17. The part 15 carries a transversely extending pin 18 which extends through slots 19 in the guide portion of the part 14, and this part 14 is formed with an external flange 20 between which and the end of the bore in the attachment member 12 is a spring 21, which tends to move the attachment member 12 outwardly to its extended position, as in Figs. 3 and 4 when its movement is limited by an external peripheral flange 12¹ abutting the stop formed by the reduction in the bore of the holding member 13.

Bayonet joint slots 22 extend in from the inner end of the attachment member 12 and the arrangement is again such that on axial displacement of the attachment member 12 against the spring 21, the pin 18 will enter the slots 22 and, on partial rotation of the attachment member 12, effectively hold that member in retracted position with its outer end flush with the end of the holding member 13. Should the attachment member 12 be retracted in an angular position other than that in which the pin 18 can enter the slots 22, the inner end of that member will engage the pin 18 and bodily displace the same and the tubular part 15 against the action of its spring 17. Then, in order to latch the attachment member 12 in retracted position, it is sufficient merely to rotate it until the pin 18 will enter the slots 22 when the spring 17 will move the tubular member 15 in a reverse direction for the pin 18 to ride up the slots 22 whereupon the latching engagement can be completed by further partial rotation of the attachment member indicated by the arrow in Fig. 5. The attachment member 12 has its projecting portion provided with an aperture 23 in which may engage a shackle, hook or other securing member and the end thereof is also provided with a slot 24 in which a coin or tool may engage to facilitate rotation of the attachment member.

The part 14 may be secured in any convenient way, for example in the manner illustrated by securing it to a bar 25 the ends of which enter slots 26 in the end of the holding member 13, which bar 25 is secured by a cir-clip 27 engaging in a groove formed in the inner wall of the member 13.

What I claim is:

1. A retractable lashing and like attachment device, comprising a holding member having a bore therein, a part tubular attachment member axially slidable and rotatable in said bore, a guide member carried at the end of said holding member, a spring-loaded member displaceably mounted in said guide member, a transversely extending rod carried by said spring-loaded displaceable member, bayonet joint slots in the tubular end of said attachment member capable of engaging with said rod, a spring disposed between the end of the tubular portion of said attachment member and said guide member to tend to urge said attachment member into its extended operative position, and means for limiting the movement of said attachment member in its extended position.

2. A retractable attachment device which comprises, in combination: a holding member formed with a cylindrical bore therein, an attachment member having a portion thereof of tubular form, said attachment member being both axially slidable and rotatable in said bore in said holding member; a guide member formed with an axially-extending cylindrical bore and an external flange, said guide member being supported at the lower end of said holding member; a displaceable member mounted in said bore in said guide member for axial movement therein; a spring surrounding part of said displaceable member urging said displaceable member outwardly in said bore, away from said external flange of said guide member; a transversely extending rod carried by said displaceable member; bayonet joint slots formed in the tubular end portion of said attachment member, said slots being capable of engaging said transversely extending rod; a spring axially positioned in said tubular portion of said attachment member between the end thereof and said guide member, said spring tending to urge said attachment member outwardly, away from said guide member, into its extended operative position; and means associated with said holding member for limiting outward movement of said attachment member into its extended operative position.

3. A retractable attachment device as defined in claim 2, wherein slots are provided in said guide member to permit said transversely extending rod to extend therethrough.

4. A retractable attachment device which comprises, in combination: a holding member formed with a cylindrical bore therein; an attachment member partly of tubular form, said attachment member being both axially slidable and rotatable in said bore in said holding member, and being provided with bayonet joint slots in the tubular end portion thereof; a guide member formed with an axially-extending cylindrical bore and an external flange, said guide member being supported at the lower end of said holding member; a displaceable member mounted in said bore in said guide member for axial movement therein; a spring surrounding part of said displaceable member urging said displaceable member outwardly in said bore, away from said external flange of said guide member; a transversely extending rod carried by said displaceable member, said rod being adapted to be engaged in said bayonet slots in said attachment member; a spring axially positioned in said tubular portion of said attachment member, between the end thereof and said guide member, said spring tending to urge said attachment member outwardly, away from said guide member, into its extended operative position; means on said holding member cooperating with means on said tubular portion of said attachment member for limiting outward movement of said attachment member into its extended operative position; and means, including a bar supporting the lower end of said guide member, and slots to receive the ends of said bar formed in said holding member, whereby said guide member is supported at the lower end of said holding member.

References Cited in the file of this patent

UNITED STATES PATENTS

| 816,317 | Hammarlund | Mar. 27, 1906 |
| 1,488,031 | Bridgwood | Mar. 25, 1924 |
| 2,444,919 | Cotton et al. | July 13, 1948 |
| 2,521,516 | Heidman et al. | Sept. 5, 1950 |

FOREIGN PATENTS

| 277,923 | Germany | Sept. 10, 1914 |